United States Patent [19]

Hurn

[11] 4,306,709

[45] Dec. 22, 1981

[54] WORKPIECE SUPPORT ARRANGEMENT

[75] Inventor: Richard L. Hurn, Ridgely, Md.

[73] Assignee: Black & Decker Inc., Newark, Del.

[21] Appl. No.: 42,959

[22] Filed: May 29, 1979

[51] Int. Cl.[3] .......... B23Q 1/04

[52] U.S. Cl. .......... 269/75; 269/139; 269/219; 269/283

[58] Field of Search .......... 269/75, 45, 157, 160-161, 269/88, 96, 271, 261, 279-280, 283, 238

[56] References Cited

U.S. PATENT DOCUMENTS

| | | | |
|---|---|---|---|
| 800,685 | 10/1905 | Scoggins | 269/283 |
| 2,642,767 | 6/1953 | Kester | 269/97 X |
| 4,070,011 | 1/1978 | Glesser | 269/45 |
| 4,078,782 | 3/1978 | Carlson | 269/283 |

FOREIGN PATENT DOCUMENTS

| | | | |
|---|---|---|---|
| 716367 | 6/1942 | Fed. Rep. of Germany | 269/75 |

*Primary Examiner*—Robert C. Watson

*Attorney, Agent, or Firm*—Edward D. Murphy; Marilyn L. Olshansky; Walter Ottesen

[57] ABSTRACT

An improved workpiece support arrangement is described having a vise including first and second jaw members, demountable first auxiliary support bodies rotatably supported on said jaws and demountable second auxiliary workpiece gripping bodies demountably supported on said first auxiliary bodies.

25 Claims, 7 Drawing Figures

WORKPIECE SUPPORT ARRANGEMENT

BACKGROUND OF THE INVENTION

1. Field of the Invention

This invention relates to devices for supporting workpieces. The invention relates more particularly to auxiliary means for extending the usefulness of such devices.

2. Description of the Prior Art

Workpiece supporting devices are known for engaging and supporting a workpiece during working operations. A device generally comprises a vise having a pair of jaw members and means for adjusting the spacing between the jaw members for gripping and releasing a workpiece. Jaw members are generally adapted to grip a workpiece with substantial force and accordingly they are relatively bulky and can grip with facility only those workpieces which can be readily handled.

At times it is desirable to perform working operations on workpieces which cannot be readily handled with facility by the gripping jaws of a vise. For example, it is desirable at times to grip relatively small sized articles during working operations such as pin sized articles. It becomes inconvenient and time consuming to position and grip such articles in the relatively large size jaw members. In addition, the relative size of the jaw members and the article will limit to a large extent the accessibility of tools to the article without repeated time consuming repositioning. It is also desirable at times to perform a working operation on one or more workpieces which are to be supported simultaneously at a plurality of different locations, as for example, supporting two or more articles such as electrical wires, which are to be soldered. The jaw members of a vise are useful to this extent only when the different support locations lie in a same plane of the gripping faces of the jaw members.

The support of different workpieces is enhanced by the use of an adjustable device capable of supporting a large range of workpiece sizes and configurations. One such device described in U.S. Pat. Nos. 3,615,087, 3,841,619 and 4,076,229 to Arnold Hickman and which are assigned to the Assignee of this invention provides for variation of angularity between a pair of gripping members. The gripping range of this device is increased by the use of swivel pegs which are rotatably mounted to the gripping members and which are adapted to receive and engage a workpiece. While the range of this device is thus enhanced, the arrangement is not adapted to support relatively small workpiece articles or to support workpieces at a plurality of different locations.

In general, while a vise is found to be substantially inconvenient as a support means for supporting relatively small articles or for supporting workpieces at a plurality of different locations, it may be uneconomical to provide a separate jig or fixture solely for supporting these types of workpieces. It would be beneficial to provide a vise or other workpiece supporting device capable of satisfying these various needs.

SUMMARY OF THE INVENTION

Accordingly, it is an object of this invention to provide an improved workpiece supporting device.

Another object of the invention is to provide a workpiece supporting device adapted for supporting a relatively small article during a working operation.

Another object of the invention is to provide a workpiece supporting device which is adapted for simultaneously supporting one or more workpieces at a number of different locations.

Another object of the invention is to provide auxiliary workpiece support means for increasing the usefulness of a vise.

Another object of the invention is to provide auxiliary means for use with a workpiece support device for supporting a workpiece at a plurality of different locations on the workpiece.

Another object of the invention is to provide auxiliary means for use with a device which provide for supporting relatively small articles during a working operation.

Another object of the invention is to provide a workpiece support device having a plurality of adjustable means for providing selectively adjustable support spacing for a workpiece over a relative large range of spacings.

Another object of the invention is to provide an adjustable workpiece support device mounted on an adjustable vise jaw member and supporting an auxiliary gripping means.

Another object of the invention is to provide an improved auxiliary support body for a vise which is adapted to receive and support an auxiliary gripping member.

In accordance with features of the invention, an improved arrangement for supporting a workpiece comprises a workpiece supporting device, a first auxiliary support body and means for demountably supporting the body on the device. The first auxiliary support body includes means for engaging and supporting a workpiece. A second auxiliary body having a workpiece gripping means is also provided and means are provided for demountably supporting the second auxiliary body on the first auxiliary body for gripping a workpiece.

In accordance with more particular features of the invention, the workpiece supporting device comprises a vise having first and second adjustable jaw members. A plurality of first auxiliary support bodies are provided and are mounted on said device and are adapted to engage a workpiece. A plurality of second auxiliary workpiece gripping bodies, each having a pair of gripping jaws, are provided. The first auxiliary support bodies each include means for mounting at least one of said second workpiece gripping bodies thereto. In a particular arrangement, the first auxiliary bodies are rotatably mounted and include a bore formed therein and the second auxiliary gripping body comprises an alligator clip having a segment thereof which extends into, engages and is supported in the bore. The number of first and second auxiliary bodies utilized is determined in accordance with the support requirements of a workpiece being worked on.

In accordance with a further feature of the invention, a means for varying the spacing between the jaw members is adapted to vary the angularity between the faces of the jaw members. This arrangement is particularly advantageous since an infinite number of combinations of workpiece support spacings can be provided by adjustment of the angularity spacing between the jaw members, and by rotatable adjustment of one or more of the rotatable bodies.

In accordance with a further feature of the invention, the first auxiliary body comprises a body adapted to receive and engage a workpiece and includes means for engaging a vise jaw member and for receiving and engaging a second auxiliary gripping body. In a particular embodiment, the means for engaging the vise jaw member comprises a stud segment formed in the body which is adapted for engaging a vise jaw member and a means for receiving, engaging and supporting the second auxiliary gripping body comprises a bore formed in the first auxiliary support body for engaging an elongated segment of the second auxiliary gripping body. In a specific embodiment of the invention the bore is cylindrically shaped and the second auxiliary gripping body comprises an alligator clip having a tubular segment extending therein.

An alternative arrangement in accordance with the invention provides means for mounting an auxiliary gripping body to a vise jaw member. In a particular embodiment, the gripping body comprises an alligator clip and the mounting means comprises a cavity formed in the jaw member for receiving and gripping a segment of the alligator clip.

BRIEF DESCRIPTION OF THE DRAWINGS

These and other objects and features of the invention will become apparent with reference to the following specification and to the drawings wherein.

DETAILED DESCRIPTION

Figure 2:
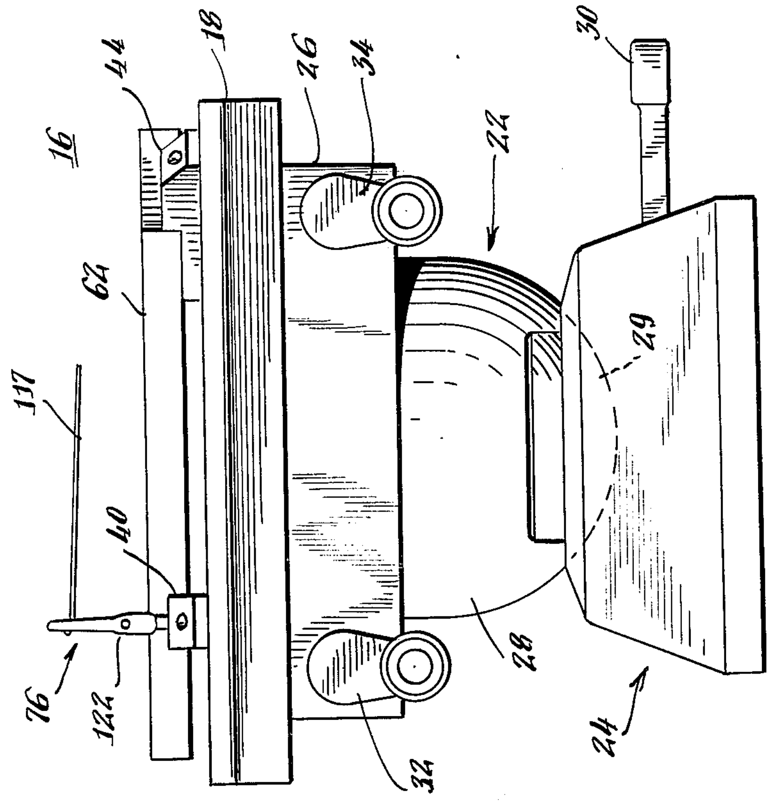
FIG. 2 is a front elevation view of the vise of FIG. 1.

Referring now to the drawings, a workpiece supporting device is shown to comprise a vise 16 having a stationary gripping jaw member 18 and a transportable gripping jaw member 20. A support means for the jaw members is provided and comprises a support body 22 and a base body 24. The support body 22 includes a frame member 26 and an integrally formed bowl shaped member 28. The bowl shaped member 28 is seated in a cavity 29 of the base body 24 and is captivated and restrained therein. A means for enabling and inhibiting the restraint includes a lever arm 30.

First and second crank arms 32 and 34 are provided and are coupled to associated first and second screws 33 and 35 (FIG.3) for causing relative motion between the jaw members 18 and 20. The crank arms 32 and 34 are operable simultaneously or independently and provide an angularity control whereby the relative spacing between faces 36 and 38 of the jaw members 18 and 20 respectively is effected to provide both adjustable spacing between the faces and a parallel or anti-parallel relationship between these faces. The vise 16 along with the means for varying the spacing between the jaws is described in greater detail in copending U.S. patent application, Ser. No. 042,778 now abandoned which is filed concurrently herewith and which is assigned to the assignee of this invention. The disclosure of this copending application with respect to the detailed structure of the vise 16, its mode of operation, and, the support for, the spacing control, and the angularity control of the jaw members 18 and 20 is specifically incorporated herein by reference.

Figure 1:
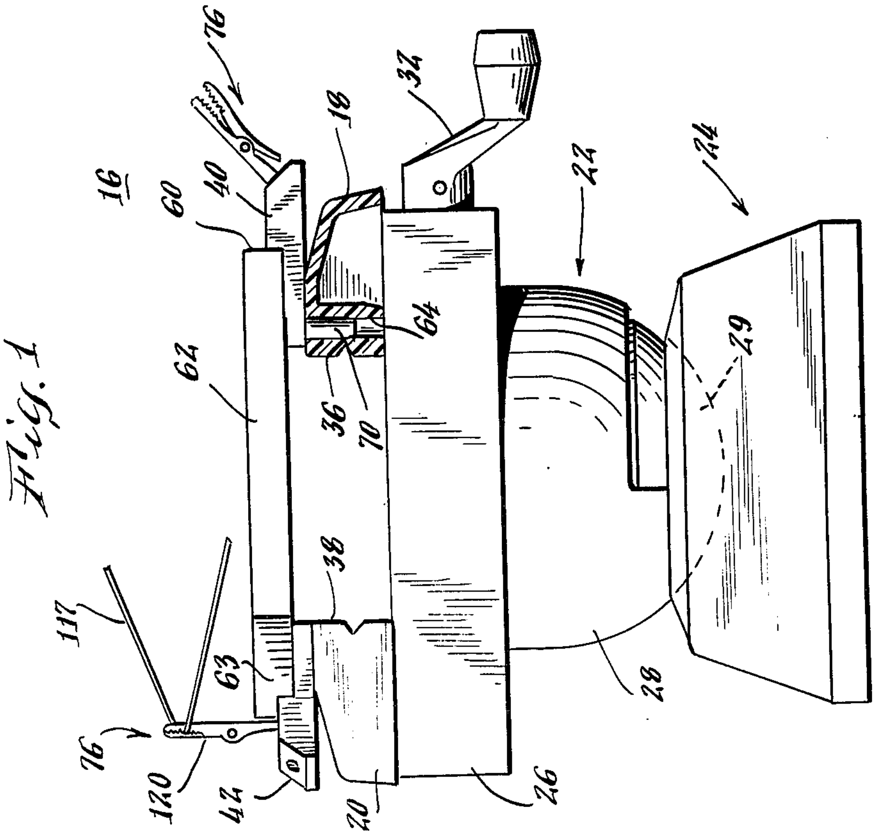
FIG. 1 is a side elevation view of a workpiece support device constructed in accordance with one embodiment of the present invention.
Figures 3, 4, 5, 6, 7:
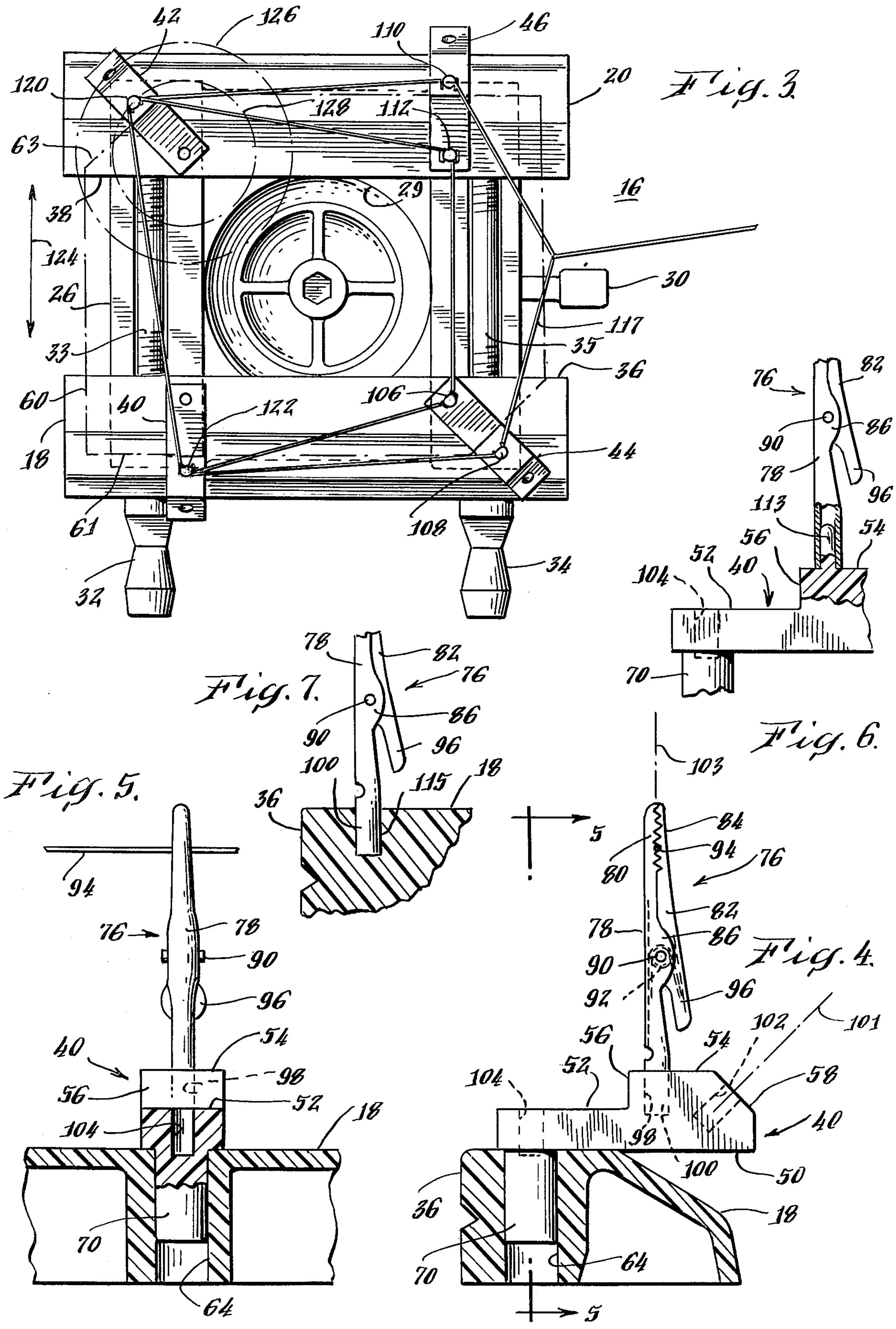
FIG. 3 is a plan view of the vise of FIG. 2 and illustrates the support of a workpiece at a number of different locations.
FIG. 4 is an enlarged fragmentary view of a first auxiliary support body illustrating a second auxiliary gripping body mounted and supporting a relatively small article therein.
FIG. 5 is a view taken along line 5—5 of FIG. 4.
FIG. 6 is a fragmentary view illustrating an alternative mounting of a second auxiliary gripping body to the first auxiliary body; and, FIG. 7 is a fragmentary view of an auxiliary gripping body mounted to a vise jaw member.

The vise 16 by virtue of the adjustable jaws 18 and 20 provides for gripping workpieces of various sizes and configurations to the extent of the maximum spacing between these jaws. A plurality of first auxiliary support bodies 40, 42, 44 and 46 (FIG. 3) are provided. A means is also provided for demountably supporting the first auxiliary support bodies 42 and 44 on the jaw member 18 and the first auxiliary support bodies 42 and 46 on the jaw member 20. As shown in FIG. 4, the first auxiliary support body 40 includes a bottom planar surface 50, a first upper planar surface 52, a second upper planar surface 54, a vertical surface 56, and a beveled surface 58. The surfaces 52 and 56 provide for receiving and engaging a first end 60 of a workpiece 62 (FIG. 1). An opposite end 63 of the workpiece 62 is received and engaged by the oppositely positioned auxiliary support body 42. Adjustment of the spacing between the jaw members 18 and 20 to enlarge the spacing permits the auxiliary support bodies 40 and 42 to be spaced for receiving the work body 62. Subsequent adjustment of the jaw members 18 and 20, in order to narrow the spacing, will cause engagement and captivation of the workpiece 62 between these auxiliary support members.

As best seen in FIGS. 4 and 5, a means for demountably supporting the first auxiliary body 40 comprises a cavity 64 formed in the jaw member 18. The cavity 64 is adapted to receive a stud 70 which is integrally formed with the body 40. The body 40 is supported by positioning the stud 70 in the cavity 66 and is demountable by withdrawing the same from the cavity. The body 40 is rotatably mounted on the jaw member 18 by virtue of the cylindrically shaped bore 66 and the cylindrically shaped stud 70. The mechanical fit between engaging surfaces enables rotation of the body 40 in the cavity 64.

A second auxiliary gripping body 76 having a workpiece gripping means comprising first and second jaw members is provided. The body 76 comprises a first elongated member 78 having a gripping jaw 80 with teeth formed therein and a second elongated member 82 having a gripping jaw 84 with teeth similarly formed therein. A means for rotatably mounting the member 82 to the member 78 comprises a pair to transversely extending tabs formed in member 78 one of which is shown in FIG. 4 and is indicated generally by the reference numeral 86 and having aligned apertures formed therein. The member 82 similarly includes a pair of tabs, not illustrated, also having aligned apertures formed therein. Tab apertures of the member 78 and member 82 are arranged for alignment and a pin 90 extends therebetween to provide rotary motion of the member 82 about the pin. A resilient biasing means comprising a spring 92 is provided for mechanically biasing the jaw 84 into engagement with the jaw 80 for gripping a workpiece therebetween. In FIGS. 4 and 5, the auxiliary body 76 is shown gripping the pin shaped article 94. Release of the article is effected by applying hand pressure to a lower segment 96 of the member 82 thereby causing rotation of the member, separation of the jaws and release of the article.

A means for demountably supporting the second auxiliary body 76 on the first auxiliary body 40 comprises a cavity 98 formed in a segment of the body 40. The cavity is formed for engaging a segment 100 of the second auxiliary gripping body 76 which conforms in configuration with the cross section of the cavity. The segment 100 comprises a relatively thin walled tubular segment. Alternatively, the segment 100 can be cylindrical or solid and the cavity 98 and segment 100 can have configurations such as square, rectangular, hexagonal, etc. The cavity 98 of FIGS. 4 and 5 illustrates the positioning of the body 76 in an upright attitude. A cavity 102 is provided and formed at an angle with respect to the cavity 98 for supporting the body 76 along an axis 101 which is anti-parallel with respect to an axis 103 of the body in cavity 98. A body so supported is illustrated in FIG. 1. A third cavity 104 is also provided for positioning and supporting a second auxiliary gripping body 76 at a third different location on the body 40. The body 76 is mounted by extending its segment 100 into a selected cavity and is readily demounted by the application of finger pressure for withdrawing the body from a cavity. One or more second auxiliary gripping bodies 76 can be mounted simultaneously in a support body as is illustrated in FIG. 3 by the second auxiliary gripping bodies 106 and 108 mounted on the support body 44 and the second auxiliary gripping bodies 110 and 112 mounted on the support body 46.

FIG. 6 illustrates an alternative arrangement of a means for demountably mounting the second auxiliary gripping body to the first auxiliary support body. In the arrangement of FIG. 6, the first auxiliary support body 40 includes an integral extending stud segment 113 and the body 76 includes a tubular segment which enables the body 76 to be positioned on and about the stud and to be supported thereby.

A further alternative arrangement for supporting the auxiliary gripping body 76 is illustrated in FIG. 7. In this arrangement a cavity 115 is formed in the jaw member 18 and is configured to receive and engage a segment 100 of the member 76. As indicated with respect to the cavity 98 of FIG. 4, cavity 115 in the jaw member 18 is configured to receive and engage a member 76.

The first auxiliary support bodies are of relatively light weight and relatively economical to fabricate. They are preferably formed of a polymer plastic, of, for example, nylon. The second auxiliary support body 76 is preferably formed of metal or other material. When utilized for workpieces which are to be heated, it is preferable that the body 76 be formed of a metal or a thermosetting polymer plastic. The second auxiliary gripping body 76 is a clip commercially available for electrical uses and is generically referred to as an alligator clip. Other types of configurations for gripping members and for demountably positioning on the first auxiliary support body can be provided in accordance with the invention.

The auxiliary support and gripping bodies described herein substantially extend the usefulness of a workpiece support device. The auxiliary gripping means provides for gripping of workpieces and articles of relatively small sizes and dimensions. Provision of a plurality of such bodies provides for supporting a workpiece body at a plurality of different locations. In FIG. 3, a workpiece 117 shown to be a wire frame and formed by a plurality of members being constructed is supported at six different spaced apart locations by the second auxiliary gripping bodies 106, 108, 110, 112, 120 and 122.

The vise 16 provides for adjustment between the jaw member faces 36 and 38 in a direction indicated by the arrows 124 (FIG. 3) over a range from contact between the jaw faces to a maximum spacing provided. In addition, the rotatably mounted first auxiliary support bodies are adapted to rotate in the cavity 64 to provide an outer circle 126 of support positions and an inner circle 128 of support positions. Each of the bodies 40, 42, 44 and 46 is adapted to be rotated and the number of support positions is thus adjustable both by adjusting the spacing between the jaw members 18 and 20 and by adjusting the rotary position of the first auxiliary support bodies. Furthermore, the provision of adjustable angularity between the faces 36 and 38 of the jaw members increases the possible spacing arrangements which can be provided for supporting a workpiece. The arrangement thus described substantially extends the usefulness of a workpiece supporting device in a non-complex and economical manner through the provision of a first auxiliary support body and a second auxiliary gripping body.

While there has been described a particular embodiment of the invention, it will be appreciated by those skilled in the art that variations may be made thereto without departing from the spirit of the invention and the scope of the appended claims.

What is claimed is:

1. An improved arrangement for supporting a workpiece comprising:

a. a workpiece support vise;
b. a first auxiliary support body;
c. means for demountably supporting said body for movement on said vice;
d. said body having means for engaging and supporting a workpiece;
e. a second auxiliary body having first and second resiliently biased workpiece gripping jaw members; and,
f. means for demountably supporting said second auxiliary body on said first auxiliary body for movement therewith and for gripping a workpiece.

2. An improved workpiece support arrangement comprising:

a. a workpiece support device having first and workpiece gripping jaw members and means for varying the spacing between said members for gripping a workpiece there between, said device providing a limited spatial opening between said jaw members for gripping a workpiece;
b. a first auxiliary support body positioned on said device for supporting a workpiece having a dimension greater than can be accommodated by said limited jaw opening;
c. means for rotatably and demountably supporting said first body on said device, said support means enabling the manual placement and removal of said first body unaided by tools, said support means enabling the positioning of said mounted first body at a plurality of different orientations on said device;
d. said first auxiliary support body having means for engaging and supporting a workpiece;
e. a second auxiliary support body having a workpiece gripping means; and
f. means for demountably supporting said second auxiliary support body on said first auxiliary body whereby said second auxiliary body is adapted to be repositioned upon reorientation of said first support body to support a workpiece therefrom.

3. The workpiece support arrangement of claim 2 wherein a plurality of first auxiliary support bodies are provided, means for rotatably and demountably supporting said plurality of support bodies on said device, a plurality of second auxiliary gripping bodies are provided, means for demountably supporting each of said plurality of second auxiliary bodies on a first auxiliary support body for movement therewith.

4. The workpiece support arrangement of claim 1 wherein said second auxiliary body support means supports said second auxiliary body for rotation on said first auxiliary body and for movement with said first body.

5. The workpiece support arrangement of claim 4 wherein said means for supporting said first auxiliary body comprises a stud formed on said body and a bore formed in said vise for receiving and engaging said stud.

6. The workpiece support arrangement of claim 1 wherein said means for supporting said second auxiliary body on said first body comprises a bore formed in said first auxiliary body and said second auxiliary body includes a segment thereof configured to extend into and engage said bore.

7. The workpiece support arrangement of claim 1 wherein said support means for said second auxiliary body is adapted to support a plurality of second auxiliary bodies on one of said first auxiliary support bodies.

8. The workpiece support arrangement of claim 7 wherein said plurality of second auxiliary support bodies are supported for extension in anti-parallel planes.

9. The workpiece support arrangement of claim 6 wherein said bore is cylindrically shaped.

10. The workpiece support arrangement of claim 1 wherein said second auxiliary body comprises a first, elongated member having a gripping jaw formed therein, a second elongated member having a gripping jaw formed therein, means for rotatably mounting said second member to said first member for providing engagement between said jaws, and resilient means for biasing said jaws in engagement.

11. The workpiece support arrangement of claim 10 wherein said means for mounting said means for mounting said second auxiliary body includes a segment formed in said first member for engaging a bore formed in said first auxiliary body.

12. The workpiece support arrangement of claim 11 wherein said second auxiliary body comprises an alligator clip.

13. An improved arrangement for supporting a workpiece comprising:

a. a vise comprising first and second workpiece gripping jaw members, means for varying the relative spacing between said members, and a support means therefor;
b. said support means comprising a support body and a base body;
c. said base body having a cavity formed therein;
d. said support body including a frame member and a bowl shaped member;
e. said bowl shaped member positioned in said cavity;
f. a first auxiliary support body;
g. means for rotatably and demountably supporting said first auxiliary support body on a jaw member for rotatable movement thereof on said vise for engaging and supporting a workpiece;
h. a second auxiliary workpiece gripping body; and,
i. means for demountably supporting said second auxiliary gripping body on said first auxiliary support body for movement therewith.

14. The claim of claim 13 wherein said first auxiliary support body comprises a demountable swivel body.

15. The support arrangement of claim 14 wherein said swivel body includes means for supporting said second auxiliary gripping body thereon for extension in differing planes.

16. The claim of claim 14 wherein said swivel body is adapted to mount a plurality of second auxiliary support bodies.

17. The claim of claim 14 wherein a jaw member includes means for supporting a plurality of swivel bodies.

18. The claim of claim 14 wherein said first and second jaw members each include means for supporting a plurality of swivel bodies.

19. The support arrangement of claim 13 wherein said means for varying the spacing between said jaw members includes means for varying an angle between faces of said members.

20. A swivel body for mounting to an adjustable vise having jaw members to provide a first auxiliary body and for supporting a second auxiliary gripping body thereon comprising:

a. a first body having surfaces formed therein for receiving and engaging a workpiece;
b. means formed in said first body for rotatably mounting said body to a jaw member whereby said swivel body is rotatable on said jaw member; and,
c. means formed in said swivel body for demountably supporting a second auxiliary gripping body on said swivel body.

21. The swivel body of claim 20 wherein said swivel body includes means for demountably supporting a second auxiliary body at a plurality of different locations on said first body.

22. The swivel body of claim 20 wherein said means for mounting said second gripping body comprises a recess formed in said first swivel body for receiving and engaging a segment of said second gripping body.

23. The swivel body of claim 21 wherein said swivel body includes a means for supporting said second auxiliary gripping body at locations for extension along anti-parallel axes.

24. The workpiece support arrangement of claim 1 wherein said support means for said second auxiliary body is adapted to support a second auxiliary body at a plurality of locations on said first support body.

25. The workpiece support arrangement of claim 5 wherein said second auxiliary body comprises an alligator clip, said first body includes a bore formed therein and said clip includes a cylindrical segment for rotatably engaged the bore of said first body.

* * * * *